United States Patent [19]
Tabata

[11] Patent Number: 5,586,112
[45] Date of Patent: Dec. 17, 1996

[54] DIGITAL CROSSCONNECT SYSTEM FOR SELECTING ALTERNATE COMMUNICATION ROUTES IN CASE OF A TRANSMISSION FAULT

[75] Inventor: Osamu Tabata, Tokyo, Japan

[73] Assignee: NEC Corporation, Tokyo, Japan

[21] Appl. No.: 357,236

[22] Filed: Dec. 13, 1994

[30] Foreign Application Priority Data

Dec. 16, 1993 [JP] Japan ................................. 5-317049

[51] Int. Cl.⁶ ........................... H04J 3/14; H04L 12/26; H04L 29/14
[52] U.S. Cl. ......................................... 370/225; 370/221
[58] Field of Search ........................... 370/16, 16.1, 58.2, 370/58.3, 54, 60, 60.1, 94.1, 94.2, 94.3, 55; 379/221; 340/827; 395/182.02

[56] References Cited

U.S. PATENT DOCUMENTS

| | | | |
|---|---|---|---|
| 5,058,105 | 10/1991 | Mansour et al. | 370/16 |
| 5,182,744 | 1/1993 | Askew et al. | 370/16 |
| 5,218,601 | 6/1993 | Chujo et al. | 370/16 |
| 5,241,534 | 8/1993 | Omuro et al. | 370/16 |
| 5,319,632 | 6/1994 | Iwasaki | 370/16 |
| 5,329,520 | 7/1994 | Richardson | 370/16 |

FOREIGN PATENT DOCUMENTS

| | | |
|---|---|---|
| 60-22848 | 2/1985 | Japan . |
| 1-23647 | 1/1989 | Japan . |

OTHER PUBLICATIONS

"Synchronous Optical Network (SONET) Transport Systems: Common Generic Criteria", (Incremental Proposed Requirements to TR–NWT–000253, Issue 2), Technical Advisory, TA–NWT–000253, Issue 8, Oct. 1993, total 28 pages.

*Primary Examiner*—Hassan Kizou
*Attorney, Agent, or Firm*—Whitham, Curtis, Whitham & McGinn

[57] ABSTRACT

A plurality of crossconnect systems are respectively arranged at branch points of a network transmission line system. Each of the crossconnect systems includes a first setting unit, a second setting unit, and a checking unit. The first setting unit sets a primary transmission route of the network transmission lines. The second setting unit automatically searches for and sets an alternate route when a fault is detected in the primary transmission route set by the first setting unit. The checking unit checks the operation of each transmission line according to a predetermined timing.

20 Claims, 8 Drawing Sheets

FIG.3

| NAME OF ATTRIBUTE | CONTENTS |
|---|---|
| NODE IDENTIFIER | IDENTIFIER FOR SPECIFYING DCS |
| OPERATION STATE | INDICATING WHETHER TRANS IS OPERATED |
| MANIPULATION STATE | INDICATING WHETHER TRANS CAN BE OPERATED |
| APPLICATION CHANNEL LIST | LIST OF CTP IDENTIFIERS INDICATING CHANNELS TO WHICH TRANS IS APPLIED |
| SPARE CHANNEL LIST | LIST OF CTP IDENTIFIERS INDICATING CHANNELS WHICH CAN BE USED AS ALTERNATE ROUTES FOR TRANS |
| RESERVED CHANNEL LIST | LIST OF CTP IDENTIFIERS INDICATING CHANNELS RESERVED AS ALTERNATE ROUTES BY TRANS |
| ALTERNATE ROUTE LIST | LIST OF CTP IDENTIFIERS INDICATING CHANNELS USED AS ALTERNATE ROUTES SET BY TRANS |
| CURRENT CHANNEL LIST | LIST OF CTP IDENTIFIERS INDICATING CHANNELS CONSTITUTING ORIGINAL ROUTE REMEDIED BY ALTERNATE ROUTE |

DIGITAL CROSSCONNECT SYSTEM FOR SELECTING ALTERNATE COMMUNICATION ROUTES IN CASE OF A TRANSMISSION FAULT

BACKGROUND OF THE INVENTION

The present invention relates to a technique used for a digital communication network and, more particularly, a technique of setting an alternate route in the event of a fault.

A conventional technique will be described below with reference to FIGS. 6 to 9. FIG. 6 shows a network arrangement constituted by only digital crossconnect systems. FIG. 7 shows the arrangement of a conventional digital crossconnect system. FIG. 8 shows a network arrangement constituted by digital crossconnect systems (DCSs), line terminating multiplexers (LTMs), and add/drop multiplexers (ADMs). FIG. 9 shows a case wherein a different path is present on an alternate route. According to the conventional automatic communication network restoration scheme disclosed in Japanese Patent Laid-Open Nos. 60-22848 and 64-23647, as a communication network as a target for the automatic communication network restoration scheme (to be simply referred to as an automatic restoration scheme hereinafter) for a fault end remedy and a fault circuit end remedy, a network like the one shown in FIG. 6, is used which is constituted by only digital crossconnect systems (to be referred to as DCSs hereinafter), is assumed. Each DCS is constituted by a pair of line terminating units for terminating an optical sync signal frame, obtained by multiplexing a plurality of STS1 signals (STS: Synchronous Transmission System), and demultiplexing the frame into STS1 signals, a sync signal switch unit for crossconnecting the STS1 signals from the pair of line terminating units, and a control unit for controlling these two types of elements. For this reason, for example, a loss of signal (to be referred to as a LOS hereinafter) as a communication alarm is used as a starting trigger for starting communication network restoration processing of an automatic restoration scheme for a fault remedy.

FIG. 7 shows the internal arrangement of each DCS. Each of the pair of line terminating unit of a DCS 101 is constituted by a line terminating unit 104, a line protection switching unit 105, an STS pointer processing unit 106, and an STS path terminating/monitoring unit 107. The sync signal switch unit is constituted by an STS path switch 113. The control unit is constituted by a crossconnect agent unit 108, a TRANS process unit 109 for performing automatic restoration scheme (to be referred to as a TRANS hereinafter) processing, a management information routing managing unit 110, a pair of data communication channel terminating units 111, and a management information managing unit 112 for managing management information such as line termination point management information, path termination point management information, and a sender/chooser list 114 set by a network management system (NMS). Upon reception of an acknowledgement of a P-AIS (Path Alarm Indication Signal) from the STS pointer processing unit 106, the crossconnect agent unit 108 acquires sender/chooser information held in the management information managing unit 112. If an alarm termination point is present at a sender, the crossconnect agent unit 108 starts the TRANS process unit 109 to automatically search for and setting an alternate route.

Assume that in this automatic restoration scheme, a fault has occurred at a portion indicated by a mark "X" on a current route indicated by a dotted line in FIG. 6. In this case, if the alternate route, indicated by the chain lines, between the DCSs 101 at the two ends of the communication network including the fault portion, i.e., a communication network as a target for communication network restoration, is constituted by only the DCSs 101, no problem is posed in the use of a LOS, which is used when a communication network is to be restored by a fault end remedy, as a starting trigger.

An actual communication network, however, includes line terminating multiplexers (to be referred to as LTMs hereinafter) 131, each for terminating an optical sync signal frame obtained by multiplexing a plurality of STS1 signals, and add/drop multiplexers (to be referred to as ADMs hereinafter) 121, each capable of terminating an optical sync signal frame, obtained by multiplexing a plurality of STS1 signals, and dropping some of the STS1 signals, as shown in FIG. 8, as well as the DCSs 101 constituting the network. In the communication network shown in FIG. 8, which includes the LTMs 131 and the ADMs 121, a LOS generated in the event of a fault (optical fiber disconnection) in the communication network may be absorbed by the LTM 131 or the ADM 121 in the subsequent stage. As a result, this communication alarm may not be transferred to the DCS 101 incorporating the automatic restoration scheme. If, therefore, a LOS is used as a starting trigger for an automatic restoration scheme, automatic restoration of a communication network may not be executed.

In addition, since a communication network as a target for a fault end remedy and a circuit end remedy includes not only the DCSs 101 but also the ADMs 121, as described above, a different path like the one indicated by the chain double-dashed line in FIG. 9 may be set on the alternate route, indicated by the chain line, in the automatic restoration scheme. In this case, a transmission route included in the different path cannot be used as an alternate route. According to the internal arrangement of the existing DCS 101, it cannot be detected whether this different path is newly set. For this reason, when a fault such as an optical fiber disconnection occurs, the DCS 101 may perform alternate route setting processing while considering that this route is not used.

SUMMARY OF THE INVENTION

It is an object of the present invention to provide a digital crossconnect system which can set the optimal alternate route in the event of a fault.

In order to achieve the above object, according to the present invention, there is provided a plurality of crossconnect systems respectively arranged at branch points of a network transmission line, each of the crossconnect systems comprising a first setting unit for setting a transmission route between communication units, a second setting unit for automatically searching for and setting an alternate route when a fault is caused in the transmission route set by the first setting unit, and a checking unit for checking connection with respect to each opposing digital crossconnect system at a timing predetermined with respect to each of the adjacent digital crossconnect systems which can constitute alternate routes, in order to use the connection to set the alternate route by the second setting unit.

BRIEF DESCRIPTION OF THE DRAWINGS

FIG. 3 is a view showing management information in a management information managing unit in FIG. 1;

DESCRIPTION OF THE PREFERRED EMBODIMENT

Figure 1:
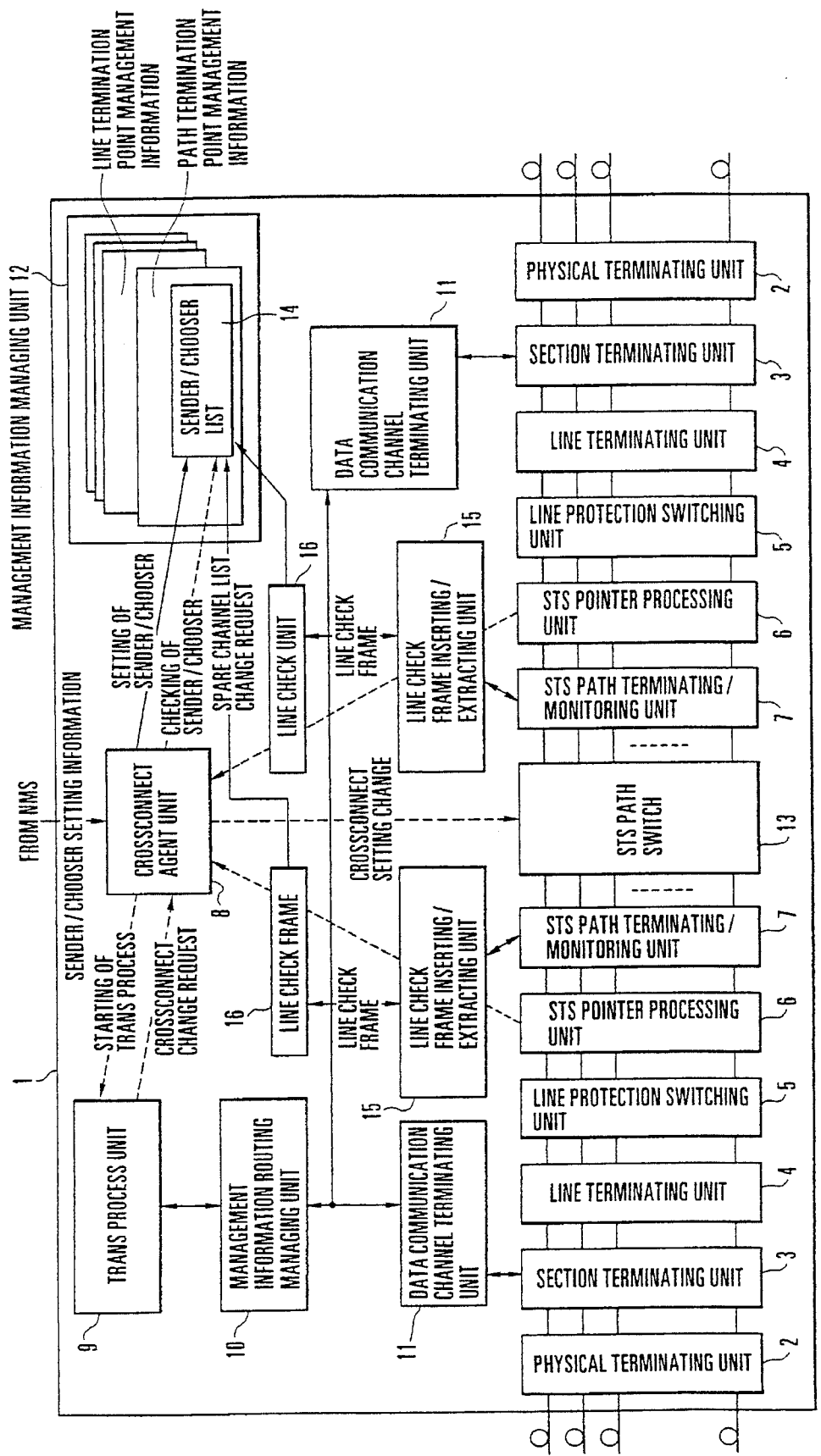
FIG. 1 is a block diagram showing the arrangement of a digital crossconnect system according to an embodiment of the present invention.

An embodiment of the present invention will be described below with reference to FIG. 1. FIG. 1 shows the arrangement of a digital crossconnect system (DCS) of the present invention, which is constituted by a pair of line terminating units, a sync signal switch unit, and a control unit. Each of the pair of line terminating units of a DCS 1 is constituted by a physical terminating unit 2, a section terminating unit 3, a line terminating unit 4, a line protection switching unit 5, an STS pointer processing unit 6, and an STS path terminating/monitoring unit 7. The sync switch unit is constituted by an STS path switch 13. The control unit is constituted by a crossconnect agent unit 8, a TRANS process unit 9 for performing automatic restoration scheme (TRANS) processing, a management information routing managing unit 10, a pair of data communication channel terminating units 11, and a management information managing unit 12 for managing management information such as line termination point management information, path termination point management information, and a sender/chooser list 14 set by information from a network management system (NMS) (not shown).

The DCS 1 also includes a line check frame inserting/extracting unit 15 and a line check unit 16, which serve as checking means for checking connection, at a predetermined timing, with respect to another DCS 1 which is adjacent to the home DCS 1 and may constitute an alternate route set by the TRANS process unit 9 when a fault is caused in a transmission route between communication units which is set by the crossconnect agent unit 8 and the STS path switch 13.

The functions of the respective components will be described in detail below.

The physical terminating unit 2 converts an optical signal into an electrical signal. The section terminating unit 3 controls termination (extraction and insertion) of section overhead. The line terminating unit 4 controls termination (extraction and insertion) of line overhead. An optical fiber generally has a 0-/1-system redundancy system configuration. The line protection switching unit 5 executes redundancy system switching control by monitoring a fault in the 0-/1-system. The STS pointer processing unit 6 extracts an SPE (Synchronous Payload Envelope) and generates an STS frame from STS payloads by analyzing/inserting pointers (H1, H2, and H3) from/in the STS frame. The STS path terminating/monitoring unit 7 extracts STS (STS payload) portions and generates an SPE from an STS path by analyzing/inserting path overhead (J1, B3, C2, and the like) of the SPE.

The crossconnect agent unit 8 receives a sender/choose setting control command from the network management system (NMS) for managing the digital crossconnect system and performs setting control of sender/chooser information with respect to the management information managing unit 12. The crossconnect agent unit 8 receives an acknowledgement of a communication alarm including a check result of noncoincidence from the line check unit 16 and acquires sender/chooser information held in the management information managing unit 12. If an alarm termination point is at the sender, the crossconnect agent unit 8 causes the TRANS process unit 9 to start TRANS. In response to a request from the TRANS process unit 9, the crossconnect agent unit 8 performs switch setting control with respect to the STS path switch 13.

The TRANS process unit 9 serves to realize control of a TRANS protocol. Upon reception of a TRANS protocol start instruction from the crossconnect agent unit 8, the TRANS process unit 9 controls transmission/reception of a TRANS packet with respect to the chooser via the management information routing managing unit 10. If a change in crossconnect setting is required in TRANS protocol processing, the TRANS process unit 9 outputs a crossconnect setting change request to the crossconnect agent unit 8.

The management information routing managing unit 10 manages a packet routing function in performing packet communication between a plurality of digital crossconnect systems constituting a communication network by using "D1", "D2", and "D3" of section overhead of an STS-1 or STS-N frame. Unique "IP addresses" are respectively assigned to the digital crossconnect systems constituting the communication network. The management information routing managing unit 10 has a routing table of the IP addresses. Upon reception of a packet transfer request from the TRANS process unit 9, the management information routing managing unit 10 determines, from the IP address of the destination, a specific one (the section terminating unit 3 in FIG. 1) of the optical fibers (which the unit 10 has) to which the packet is to be transferred, and transfers the packet to the data communication channel terminating unit 11 corresponding to the section terminating unit 3. The management information routing managing unit 10 analyzes the IP address in the packet received from the data communication channel terminating unit 11 to determine whether the packet is sent to the home digital crossconnect system or another one. If the packet is sent to the home digital crossconnect system, the management information routing managing unit 10 transmits it to the TRANS process unit 9. Otherwise, the management information routing managing unit 10 transmits the packet to the appropriate data communication channel terminating unit 11 in accordance with the routing table information.

The data communication channel terminating unit 11 terminates the protocol of a data link layer between the home digital crossconnect system and an opposing digital crossconnect system to which the corresponding optical fiber (section terminating unit 3) is connected, thereby executing protocol processing of the data like layer between the home digital crossconnect system and the opposing digital crossconnect system.

The management information managing unit 12 manages various attribute values of management information (e.g., information about a physical termination point, a section termination point, and a path termination point) held by the home digital crossconnect system. Especially, the management information managing unit 12 holds sender/chooser information, as part of the attribute value of the path termination point, which is used for the TRANS protocol in the TRANS process unit 9.

The STS path switch 13 is a switch unit for executing crossconnect setting/canceling processing on the STS-1 level. In crossconnect setting of an STS-Nc (concatenation) signal, switches corresponding to the band of the Nc component are simultaneously controlled under the same setting.

The sender/chooser list 14 is part of the management information held by the digital crossconnect system. Especially, the sender/chooser list 14 is a list of the attribute values of management information held, as sender/chooser information set by the network management system (NMS), at the path termination point (STS-1 or STS-Nc path termination point).

The line check frame inserting/extracting unit 15 inserts and sets a line check frame (to be described later) at a predetermined position in each of the STS1 signals to be transmitted to the opposing DCSs 1 via all transmission lines on which an alternate route can be set, and extracts a line check frame from the STS1 signal from the line check frame inserting/extracting unit 15 of each of the opposing DCSs 1. An inserted line check frame serves as check information, consisting of a special code, with respect to the F2 byte constituting the STS1 signal.

The line check unit 16 checks whether the check information of the line check frame from each of the opposing DCSs 1, which is extracted by the line check frame inserting/extracting unit 15, is a predetermined code. If the check information is not the predetermined code, the line check unit 16 requests the management information managing unit 12 to change the attribute values of the management information, and sends the check result of noncoincidence to the crossconnect agent unit 8.

Figure 2:
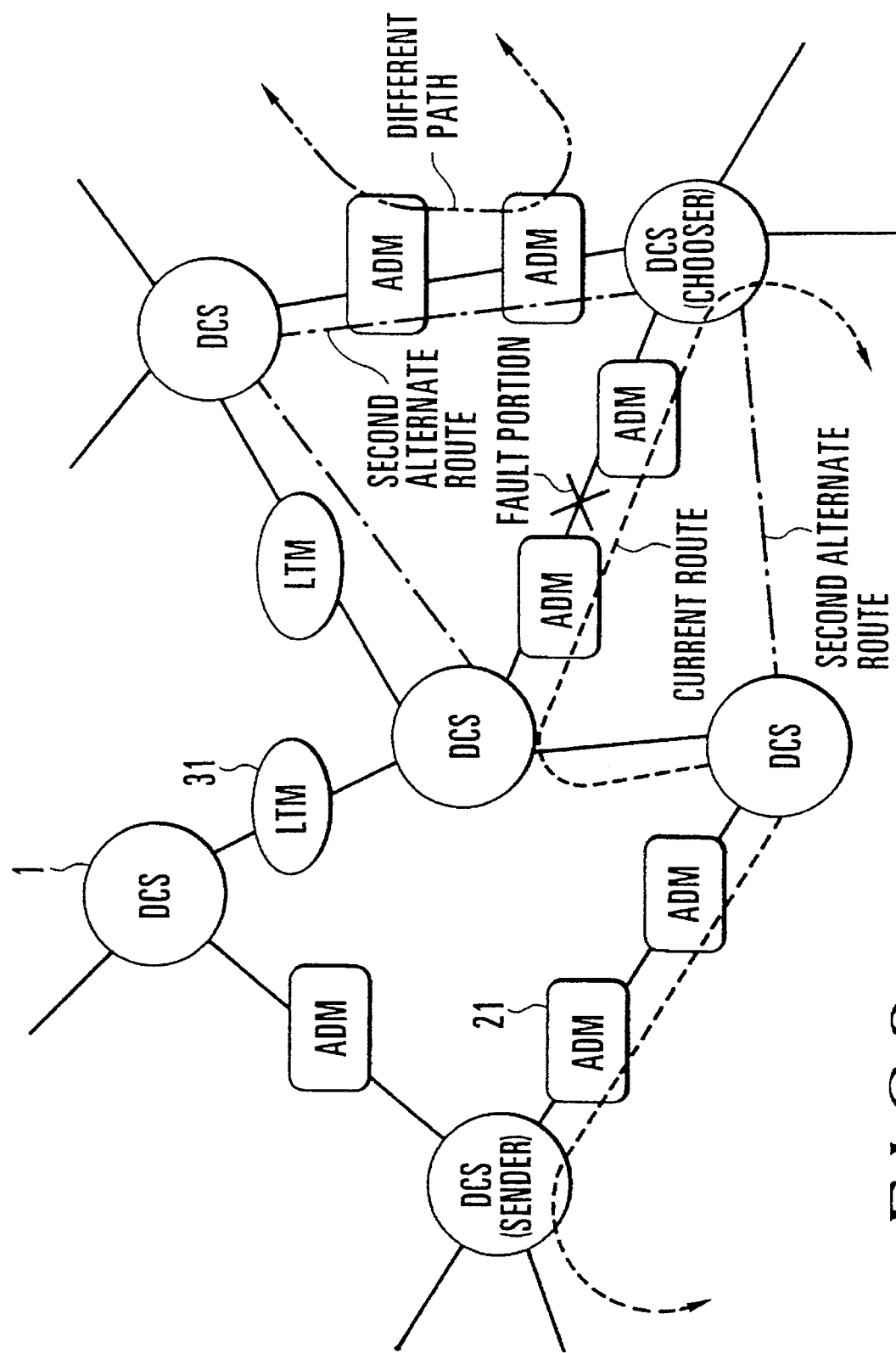
FIG. 2 is a view showing an alternate route setting operation performed by the digital crossconnect system in FIG. 1.
Figure 4:
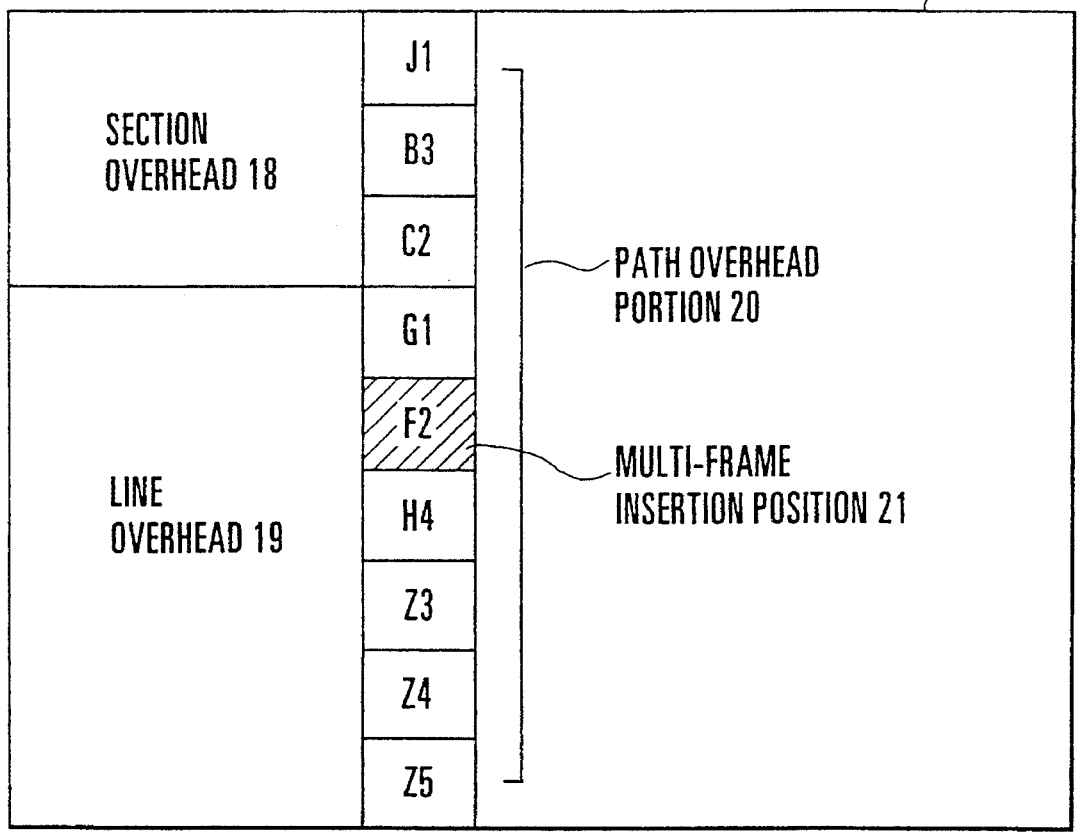
FIG. 4 is a view showing the insertion position of a line check frame.
Figure 5:
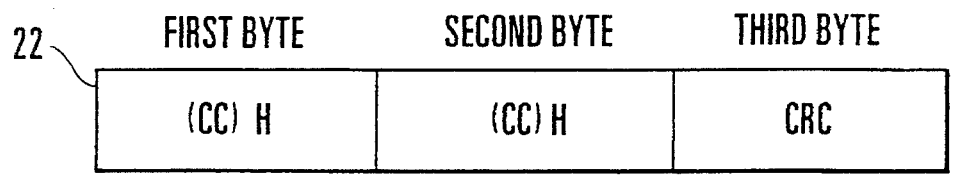
FIG. 5 is a view showing the format of the line check frame.
Figure 6:
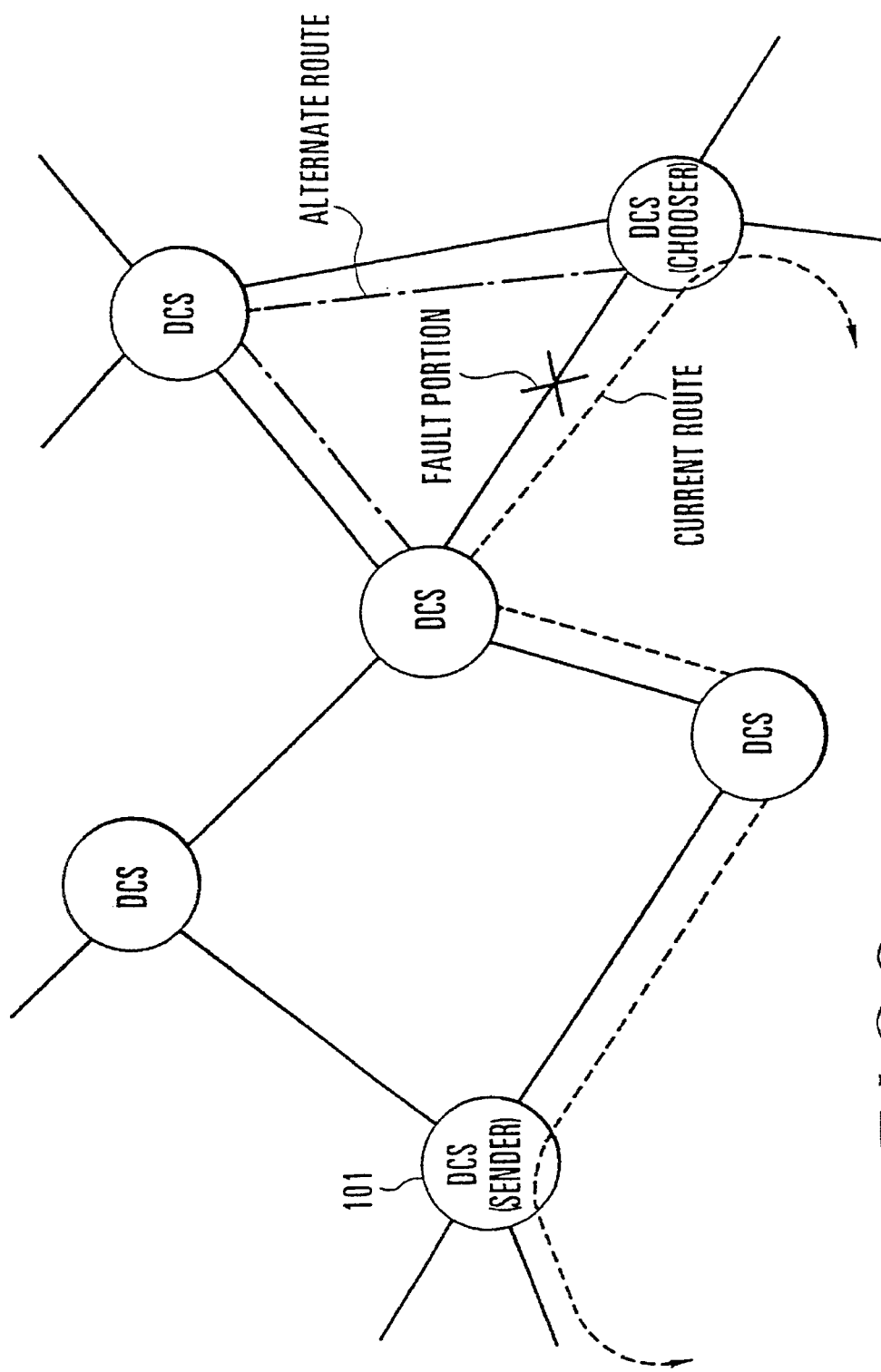
FIG. 6 is a view showing the arrangement of a network constituted by only digital crossconnect systems.
Figure 7:
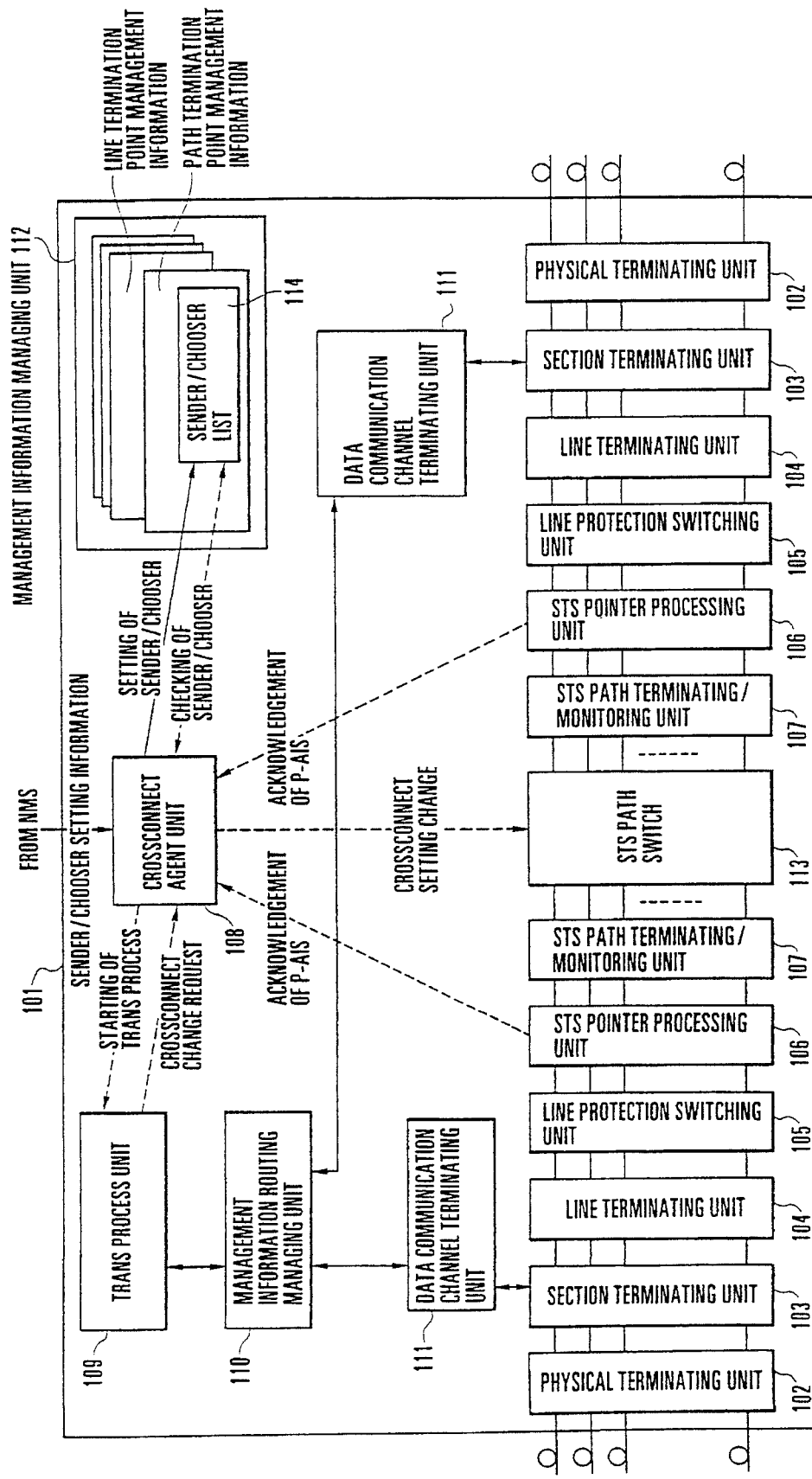
FIG. 7 is a block diagram showing the arrangement of a conventional digital crossconnect system.
Figure 8:
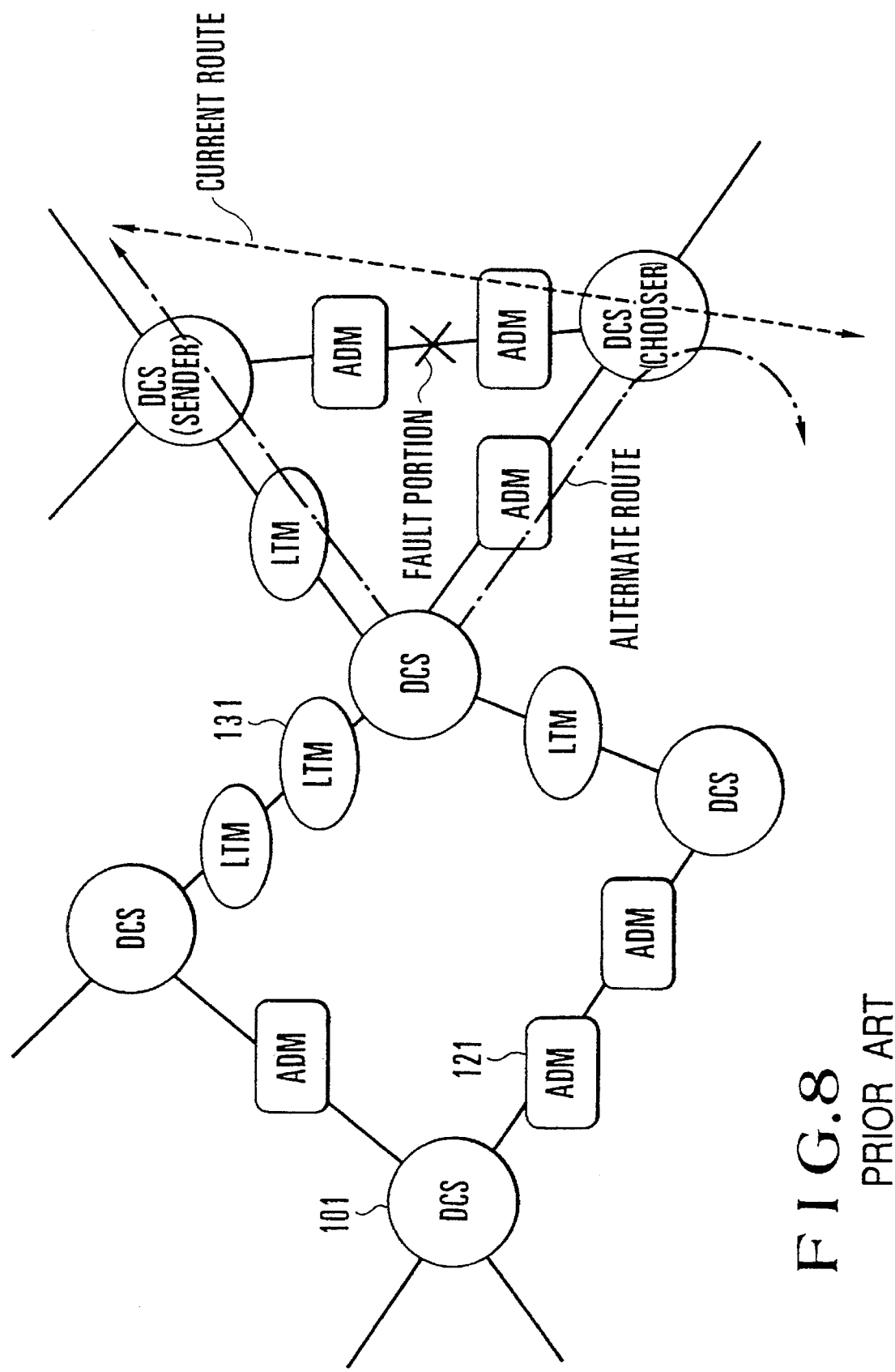
FIG. 8 is a view showing the arrangement of a conventional network constituted by digital crossconnect systems, line terminating multiplexers, and add/drop multiplexers.
Figure 9:
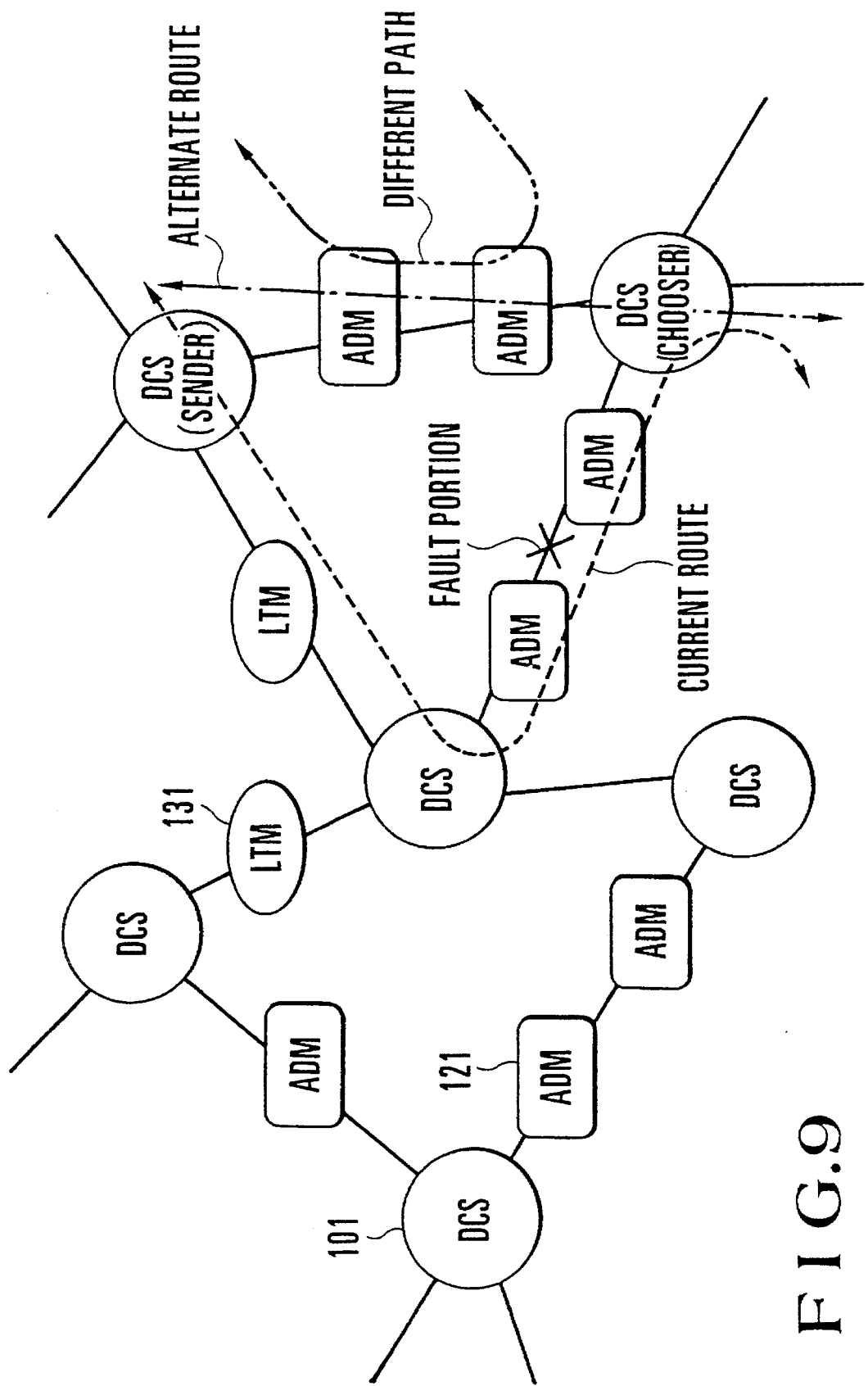
FIG. 9 is a view showing the arrangement of a conventional network in which a different path is present on an alternate route.

The operation of the crossconnect system having the above arrangement will be described next with reference to FIGS. 2 to 5. FIG. 2 shows an alternate route setting operation performed by the digital crossconnect system shown in FIG. 1. FIG. 3 shows management information in the management information managing unit shown in FIG. 1. FIG. 4 shows the position where a line check frame is inserted. FIG. 5 shows the format of a line check frame. As shown in FIG. 2, a communication network (optical sync signal network) as a target for automatic restoration is constituted by the DCSs 1, ADMs 21, and LTMs 31 for performing route switching of the STS1 signals. Each DCS 1 incorporates the TRANS process unit 9 for autonomously detecting a fault such as disconnection of an optical fiber and performing control to detour around a transmission line having the fault. When a fault is caused in a transmission unit (ADM or LTM) itself, which constitutes a path set by using the DCSs 1, or a fault such as disconnection of an optical fiber constituting the set path is caused, the TRANS process unit 9 automatically searches for and sets an alternate route for remedying the fault path between the DCSs 1. There are two schemes for this alternate route searching and setting processing, i.e., a scheme for a fault end remedy, in which one shortest route is set to allow the entire path in which a fault has occurred to detour, and a scheme for a circuit end remedy, in which an alternate route is set for each of the STS1 signals in the path in which a fault has occurred. One of the schemes can be selected in the DCS 1.

In this communication network, each DCS 1 transmits/receives an STS1 signal frame 17 shown in FIG. 4 to/from each adjacent DCS 1 at a predetermined timing. The STS1 signal frame 17 shown in FIG. 4 is constituted by a path overhead portion 20 consisting of section overhead 18 and line overhead 19. A special code is inserted, as a 3-byte multi-frame 22 shown in FIG. 5, in the F2 byte (multi-frame insertion position 21) as a constituent element of the STS1 signal frame 17. With this insertion of the code, each DCS 1 checks connection for each STS1 signal.

Assume that a fault such as an optical fiber disconnection is caused, as shown in FIG. 2, while the automatic restoration scheme for a fault end remedy is selected. In this case, the multi-frame 22 in the F2 byte which is inserted, as check information, in the STS1 signal by the line check frame inserting/extracting unit 15 of the opposing DCS 1 is not inserted in the subsequent ADM 21 or LTM 31 again. For this reason, the multi-frame 22 as check information is not extracted by the line check frame inserting/extracting unit 15 of the DCS 1 on the receiving side, and the line check unit 16 detects an abnormality in the multi-frame 22 which is caused by an optical fiber disconnection. Since the abnormality in the multi-frame 22 can be detected by the line check unit 16 in this manner, the fault in the transmission line which is caused by an optical fiber disconnection can be detected regardless of the positional relationship with the ADMs 21 and the LTMs 31. If optical fiber disconnection is to be detected by using an LOS as in the conventional scheme, the LOS may not be transferred to the opposing DCS 1 depending on whether an ADM or an LTM is inserted behind the position where optical fiber disconnection is caused.

Assume that the different path indicated by the chain double-dashed line in FIG. 2 is set on a route which can be used as an alternate route. In this case, owing to this different path, connection between the DCSs 1 on the STS1 level is canceled. For this reason, the multi-frame insertion position 21 of the F2 byte to be transmitted between the adjacent DCSs 1 is not transferred to the opposing DCS 1. As a result, the line check unit 16 detects a multi-frame abnormality caused by the different path for each STS1 signal via the line check frame inserting/extracting unit 15.

Upon detection of a multi-frame abnormality caused by an optical fiber disconnection or a different path, the line check unit 16 sends a spare channel list change request to the management information managing unit 12. In response to this change request, the management information managing unit 12 performs update processing to inhibit the use of CTP (Connection Termination Point) numbers (management information corresponding to the STS path terminating/monitoring unit 7) corresponding to a channel in which the abnormality is detected, as information for alternate routes for TRANS (automatic restoration scheme) in a spare channel list in the channel (corresponding to a path for the SRS1 signal) management information shown in FIG. 3. That is, the management information managing unit 12 deletes these routes from the alternate route candidates.

Furthermore, upon detection of a multi-frame abnormality, the line check unit 16 notifies the crossconnect agent unit 8 of the occurrence of the abnormality. Upon this notification, the crossconnect agent unit 8 starts the TRANS process unit 9 by referring to the sender/chooser list 14 of the management information managing unit 12. Note that the TRANS process unit 9 may be started only when it is determined that a multi-frame abnormality is caused by disconnection of a transmission line. The started TRANS process unit 9 automatically searches for and sets an alternate route on the basis of the management information of the management information managing unit 12, and sends a crossconnect change request to the crossconnect agent unit 8. In response to this change request, the crossconnect agent unit 8 performs control of crossconnect setting change processing with respect to the STS path switch 13, thereby setting an alternate route.

In this case, the TRANS process unit 9 sets the alternate route while considering only the CTP information listed, as information which can be used, in the sender/chooser list 14 as alternate routes which can be used. Therefore, the TRANS process unit 9 select no route which cannot be used because of a different path. That is, in the case shown in FIG. 2, the second alternate route including the different path is not selected, but the first alternate route is selected.

As has been described above, according to the present invention, the optimal alternate route can be set in the event of a fault by monitoring the connected state of a transmission line between DCSs. Therefore, an alternate route can be quickly set without interfering with communication performed on other transmission routes.

What is claimed is:

1. A plurality of crossconnect systems located at intersections of network transmission lines, said network transmission lines connecting communication units, each of said crossconnecting systems comprising:

a first setting means for selecting at least one of said transmission lines as a transmission route between communication units;

second setting means for automatically searching for and selecting at least one of said transmission lines as an alternate route in response to a fault detection signal representing a fault detected in the transmission route; and checking means for checking an operating condition of said network transmission lines, said checking an operating condition including detecting a fault and outputting said fault detection signal to said second setting means thereby allowing said second setting means to select said alternate route.

2. Systems according to claim 1, wherein said checking means comprises:

transmission/reception means for transmitting a line check frame along a transmission line of said network transmission lines for determining said operating condition of said transmission line for establishing said alternate route, and detection means for detecting an abnormality in the line check frame transmitted by said transmission/reception means.

3. Systems according to claim 2, wherein said transmission/reception means includes inserting/extracting means for recording a special code, as said line check frame, in an F2byte of a synchronous transmission system signal transmitted along said transmission line, and said detection means comprising comparing means for checking whether the special code from said inserting/extracting means coincides with a predetermined code, thereby determining whether said transmission line is operating and can be used as said alternate route.

4. Systems according to claim 3, wherein the special code comprises a 3-byte multi-frame;

said 3-byte multi-frame including three 1-byte data elements.

5. Systems according to claim 1, further comprising:

information storage means for storing management information including information about said operating condition of said network transmission lines, wherein upon determining an abnormality in a transmission line, said checking means performs update processing to inhibit use of said transmission line by modifying said management information stored in said information storage means, and said second setting means selects said alternate route on the basis of said management information.

6. Systems according to claim 5, wherein said second setting means selects said alternate route on the basis of an output from said checking means when said checking means indicates an abnormality in said transmission line, and the management information in said information storage means indicates the operability of said alternate route.

7. A system according to claim 1, further comprising:

an add-drop multiplexor; and a transmission line connecting said add-drop multiplexor to at least one of said plurality of crossconnect systems;

wherein the checking means of said each of said crossconnecting systems further comprises means for detecting a faulty transmission of data along said transmission line and for outputting a fault detection signal representing said fault detection, and said selection means selects an alternate transmission line from among said plurality of transmission lines in response to said fault detection signal.

8. A system according to claim 1, wherein a predetermined byte within a route overhead comprises information for detecting a connection disorder.

9. A system according to claim 8, wherein each said connection disorder is processed locally between said crossconnect systems without intervention by an element external to the crossconnection systems.

10. A system for transmitting data, comprising:

a plurality of transmission lines;

a plurality of crossconnect means forming connections between said transmission lines, wherein said crossconnect means define a predetermined data path by forming connections between predetermined transmission lines of said plurality of transmission lines; and a plurality of first multiplexors and a plurality of second multiplexors connected to said transmission lines, wherein each said crossconnect means comprises:
  selection means for selecting a selected transmission line of said plurality of transmission lines; and
  detection means for detecting a faulty transmission of data along said selected transmission line, wherein said selection means selects an alternate transmission line of said plurality of transmission lines when said detection means detects a faulty transmission of data along said selected transmission line, and said alternate transmission line, in combination with other alternate transmission lines selected by other crossconnect means of said crossconnect means, comprises an alternate data path.

11. A system as in claim 10, wherein said first multiplexors comprise line terminating multiplexors and said second multiplexors comprise add/drop multiplexors.

12. A system as in claim 10, wherein said detection means comprises a line check frame unit for inserting a code in a transmitted signal output along said predetermined data path and for checking for the presence of said code in a received signal input from said predetermined path.

13. A system as in claim 12, wherein said code comprises:
a first byte containing first information;
a second byte containing second information; and
a third byte containing a check signal.

14. A system according to claim 13, wherein said first byte, second byte and third byte are located in a path overhead field of a transmitted signal.

15. A system as in claim 12, wherein said code is output by each crossconnect means at a predetermined timing and said detection means detects said faulty transmission of data when one of said code is represents fault and when said code is not received at said predetermined timing.

16. A system according to claim 12, wherein said second multiplexors comprise add/drop multiplexors.

17. A system as in claim 10, wherein said selection means comprises:

management information means for maintaining line availability information based on an operating status of each transmission line connected to a respective crossconnect means, wherein said operating status is obtained from said detection means.

18. A system as in claim 10, wherein upon detection of said faulty transmission of data, said alternate transmission line is selected by at least two crossconnect means so that said alternate path bypasses a faulty transmission line and returns to said predetermined transmission line.

19. A system as in claim 10, wherein upon detection of said faulty transmission of data, said plurality of crossconnect means select transmission lines so that said alternate path does not include transmission lines of said predetermined path.

20. A system according to claim 10, wherein a predetermined byte within a route overhead comprises information for detecting a connection disorder.

* * * * *